United States Patent

[11] 3,621,184

| [72] | Inventor | André Miéville |
| | | Lausanne, Switzerland |
| [21] | Appl. No. | 823,555 |
| [22] | Filed | May 12, 1969 |
| [45] | Patented | Nov. 16, 1971 |
| [73] | Assignee | M.E.D.I. |
| | | Geneva, Switzerland |
| [32] | Priority | Nov. 27, 1968 |
| [33] | | Switzerland |
| [31] | | 17,647/68 |

[54] SPOT WELDING APPARATUS
4 Claims, 2 Drawing Figs.
[52] U.S. Cl. .................................................. 219/127
[51] Int. Cl. .................................................. B23k 9/00
[50] Field of Search .................................... 219/127, 131, 97, 98

[56] References Cited
UNITED STATES PATENTS
2,845,524  7/1958  Morley, Jr. et al. ........... 219/127 X

| 3,045,107 | 7/1962 | Espenlaub et al. | 219/127 |
| 2,583,665 | 1/1952 | Pilia | 219/127 |
| 2,673,278 | 3/1954 | Anderson | 219/127 |
| 2,898,445 | 8/1959 | Slezak | 219/127 |
| 2,917,618 | 12/1959 | Brennen et al. | 219/127 |
| 2,998,507 | 8/1961 | Brennen et al. | 219/127 X |
| 3,119,010 | 1/1964 | Kras et al. | 219/127 |

FOREIGN PATENTS
1,549,191  12/1968  France .................. 219/127

*Primary Examiner*—J. V. Truhe
*Assistant Examiner*—L. A. Schultzman
*Attorneys*—Robert E. Burns and Emmanuel J. Lobato ABSTRACT: Disclosed herein is automatic spot arc-welding apparatus comprising a pressure sensitive self-actuating device having a consumable welding electrode and an automatic feed mechanism for controlling the length of electrode consumed from one weld to the next. A delay circuit controls the welding current to continue the application of such current for a short period after termination of movement of the feed mechanism to accurately control the length of electrode which is burned off.

SPOT WELDING APPARATUS

Various types of welding apparatus are known, but none of them have at the same time an operation independent of the operator, light and manageable structure, a low-cost price and insensibility to oxidation of the surfaces.

The aim of the present invention is to unite these qualities and its subject is a spot-arc-welding apparatus comprising an electrode carrier for a consumable electrode and an electronic delay device for controlling the welding current at the termination of the used, characterized by the fact that it is provided with automatic means enabling it to be placed, after each operation, in position to carry out a new welding under identical conditions.

The accompany drawing shows, by way of nonlimiting example, an embodiment of the invention.

Figure 1:
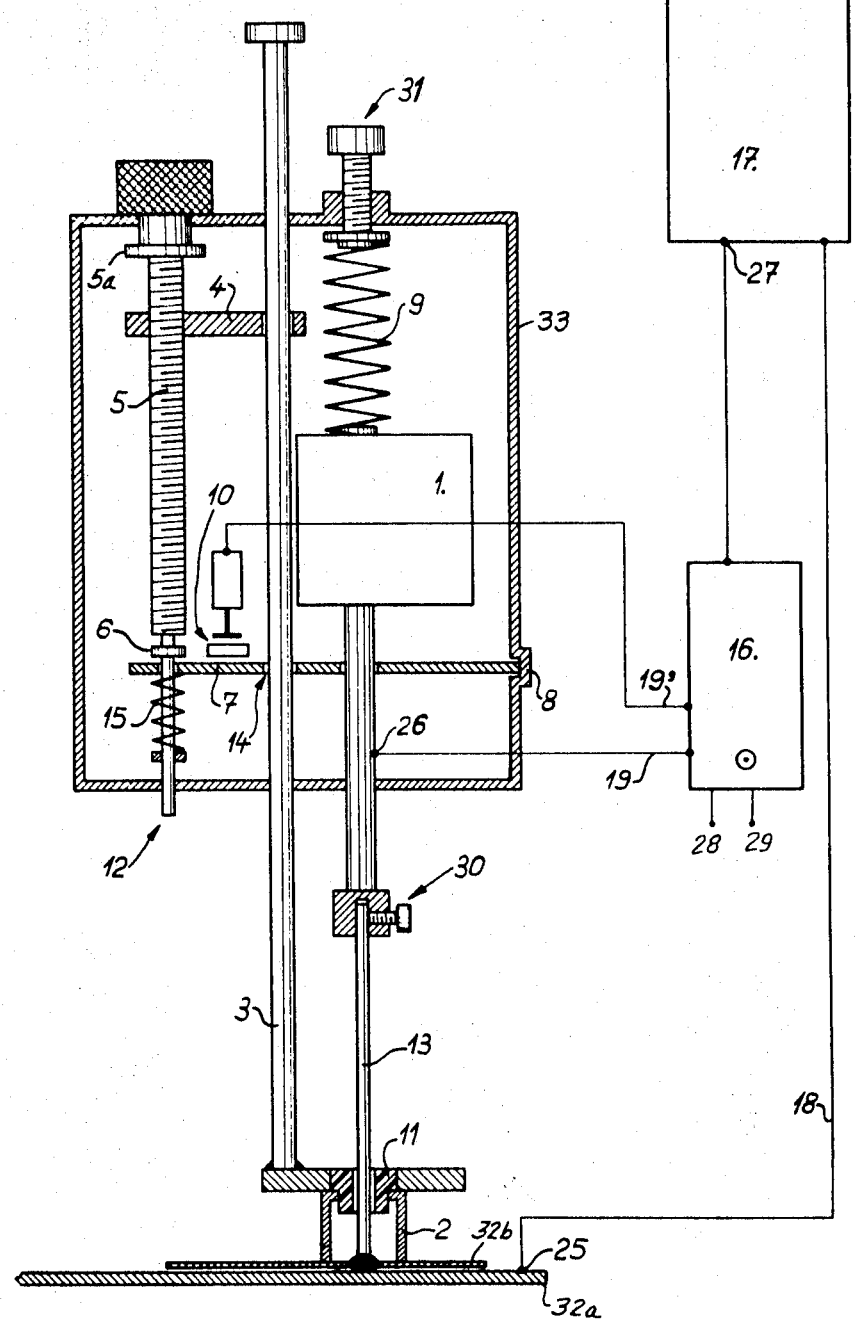
FIG. 1 shows the apparatus in cross section.

FIG. 1 shows schematically represented a weld-current generator 17 connected at 25 to the piece to be welded by a cable 18, and connected through a 18, circuit 16 and a conductor 19 to a carrier 26 for a consumable electrode 13. The electrode 13 is held on the carrier 26 by a setscrew device 30, and such carrier is fixed to a block 1 supported by a spring 9. The spring is adjustably mounted in a casing 33 by a screw 31. The electrode is shielded at its welding tip by a tube 2 disposed coaxially with the electrode and insulated therefrom by a ceramic insert 11. The tube 2 is fixed to a shaft 3 which passes through the casing 33 and through respective openings in a jam plate 7 and a stop 4, both of which are mounted within the casing. The jam plate 7 is pivotally mounted to the casing at one end 8, and is controlled for pivotal movement at its other end by a threaded rod 5, slidably mounted in the casing 33 and having a flange for preventing upward movement of the jam plate with respect to the rod 5, and having a spring 15 for urging the plate 7 against the flange 6. The stop 4 comprises a member threadably received on the rod 5 and held against rotation by the shaft 3 which passes slidably therethrough. A microswitch 10 is mounted above the jam plate 7 for actuation when the jam plate is pivoted upwardly in the casing 33.

In the operation of the apparatus, the tube 2 is placed on a workpiece 32b which is superposed on the piece 32a to which the conductor cable 18 is connected. Downward pressure on the apparatus causes the casing 33 to slide downward on the shaft 3, and causes the electrode 13 to contact the workpiece 32b. Additional pressure causes the casing to continue downward with respect to both the shaft 3 and carrier 26 until the block 1 contacts the stop 4 and pushes it and the rod upward in the casing until a flange 5a on the rod engages the casing to prevent further movement. Such upward movement of the rod allows the spring 15 to pivot the jam plate 7 upward to bind against the shaft 3 and actuate the switch 10 which allows the weld to commence. Thus, pivotal movement of the jam plate prevents any further relative movement between the casing and shaft, so that the entire apparatus is supported on the workpiece 32b by the tube 2.

Figure 2:
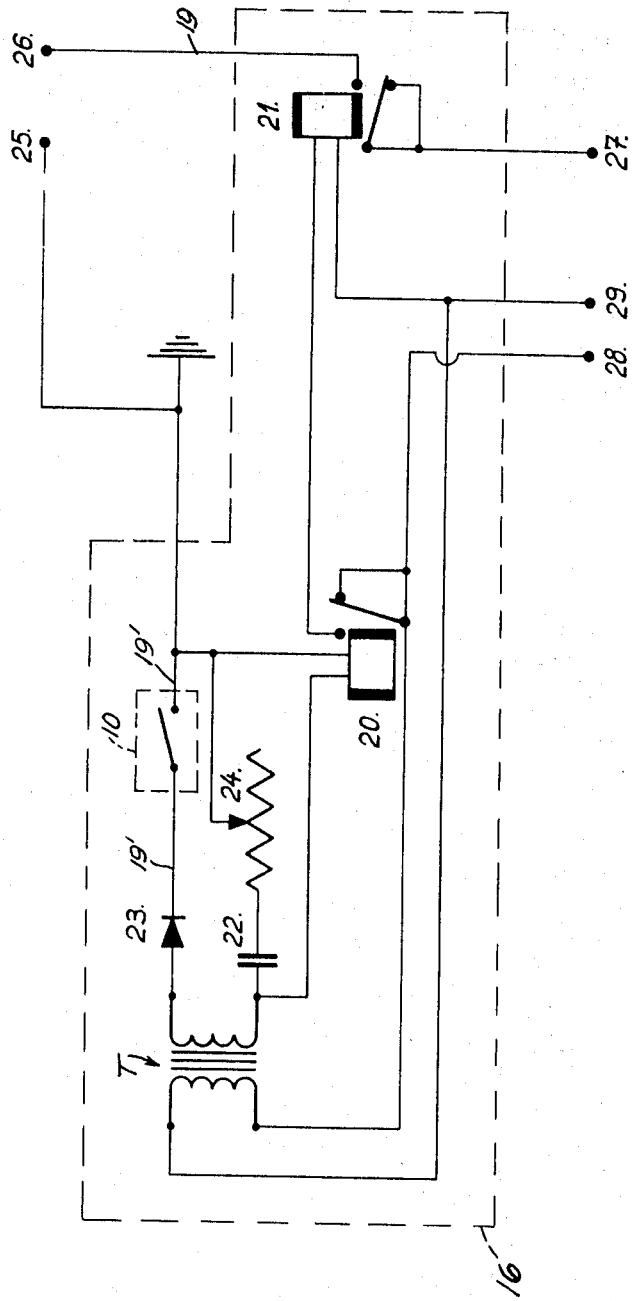
FIG. 2 shows a schematic of the electronic delay circuit.

In the automatic-switching control circuit for the device, as shown in FIG. 2, the switch 10 is connected in series with the secondary of a transformer T, a rectifying diode 23, and the coil of a relay 20. The primary of the transformer T is connected to terminals 28 and 29 coupled to a potential source such as 200 volts AC. The contacts of the relay 20 are connected to the coil of a power relay 21 having contacts for controlling the application of the potential of the generator 17, to allow the welding current to flow through conductor 19 to the carrier 26 and the electrode 13. Thus, closure of switch 10 by the jam plate 7 allows the welding current to commence by energizing relay 20 which in turn, energizes relay 21.

As the pieces 32a and 32b are welded, the electrode is consumed and the carrier 26 descends under the urging of spring 9, thus maintaining the electrode adjacent the workpiece 32b and allowing the stop 4 and rod 5 to descent together. When the block 1 descends out of contact with the stop 4, the flange 6 on rod 5 pivots the jam plate out of engagement with switch 10, and allows it to reopen.

A delay circuit, comprising a series combination of a capacitor 22 and a potentiometer 24, connected in parallel with the coil of relay 20, keeps the control circuit 16 energized for a predetermined period after the reopening of the switch 10. In operation, the capacitor is charges during the welding cycle by the rectified secondary current of transformer T, and the relay 20 is maintained in its energized state during the discharge period of the capacitor 22, such period being controlable by adjustment of the potentiometer 24. Finally, at the end of the delay period the relays 20 and 21 are deenergized, and the weld is terminated.

During this delay operation the electrode has continued to burn away and is thus located at several tenths of millimeters from the welding point. The interruption of the welding current leads to the extinction of the welding arc and the operation is finished.

To proceed to a new weld it is sufficient to apply the apparatus once more to the desired point and the triggering is carried out in an identical manner, since none of the work conditions are changed during the operation.

It is to be noted that certain apparatus can simply be mounted on a machine carrying out the operation of application and placing of the piece to be welded; there is thus obtained an entirely automatic apparatus capable of carrying out work in series.

It is additionally possible to preview a continuous conveyance of the electrode, considering that the advance of the electrode must be accompanied by an equivalent advance of the mounting support.

It will also be noted that the presence of the tube 2 allows the operator to watch the operation without carrying protective glasses.

What is claimed is:

1. Spot-welding apparatus comprising a sleeve 2 engageable with a work piece to be welded, a support rod 3 fixed to said sleeve, a casing 33 slidable on said support rod, a movable electrode carrier slidable in said casing parallel to said support rod, an electrode 13 carried by said carrier extending through said sleeve to be engageable with said workpiece, spring means 9 acting between said casing and said carrier to bias said carrier toward said workpiece, first abutment means 1 on said carrier, a control rod 5 disposed in said casing parallel to said support rod and mounted for rotation and limited longitudinal movement in said casing, said control rod having a threaded portion and a shoulder portion 6, second abutment means 4 movable in said casing in the path of movement of said first abutment means 1 and having cooperating threads engaging said threaded portion of said control rod 5 whereby the position of said second abutment means is adjustable by rotation of said control rod, a jam plate 7 pivotally mounted in said casing and having an opening receiving said support rod, said jam plate being movable between an operative position in which it grips said support rod and a released position in which said support rod is free to slide in said casing, said jam plate further being engageable by said shoulder portion 6 of said control rod 5 to control movement of said jam plate 7, circuit means for supplying current to said electrode and means controlling said current including switch means 10 operable by movement of said jam plate from released to operative position, whereby movement of said casing toward the workpiece is permitted until said first abutment means 1 engages said second abutment means 4 whereupon the resulting movement of said control rod results in movement of said jam plate to operative position to stop further movement of said casing toward the workpiece and to actuate said switch means to supply current to said electrode, until the electrode is consumed sufficiently to permit movement of said electrode carrier by said spring means to disengage said first abutment means 1 from said second abutment means 4.

2. Apparatus according to claim 1, comprising means for adjustably varying the force of said spring means 9 acting between said electrode carrier and the casing.

3. Apparatus according to claim 1, in which said circuit means comprises delay means to terminate the supply of current to said electrode after a predetermined period.

4. Spot-arc-welding apparatus as set forth in claim 1, in which said circuit means comprises a switching relay having switching contacts and an energizing coil, a series combination of said coil and the contacts of said electric switch, means for connecting said series combination to a potential source, a power relay having switching contacts and having an energizing coil connected to said contacts of said switching relay, said contacts of said power relay being coupled to conduct said weld current, and a series connected resistor and capacitor combination coupled in parallel with said switching relay coil, whereby said capacitor charges while said electrical switch is closed, and discharges to maintain said switching relay energized for said predetermined time after said electrical switch is reopened.

* * * * *